US012665117B2

(12) United States Patent
Dhokkar et al.

(10) Patent No.: US 12,665,117 B2
(45) Date of Patent: Jun. 23, 2026

(54) ELECTROTECHNICAL DEVICE FOR AN AIRCRAFT, COMPRISING LOW-FREQUENCY COIL COMPONENTS

(71) Applicant: SAFRAN ELECTRICAL & POWER, Blagnac Cedex (FR)

(72) Inventors: Sonia Dhokkar, Moissy-Cramayel (FR); Nicolas Bernard, Moissy-Cramayel (FR)

(73) Assignee: SAFRAN ELECTRICAL & POWER, Blagnac Cedex (FR)

( * ) Notice: Subject to any disclaimer, the term of this patent is extended or adjusted under 35 U.S.C. 154(b) by 868 days.

(21) Appl. No.: 17/757,047

(22) PCT Filed: Dec. 8, 2020

(86) PCT No.: PCT/FR2020/052347
§ 371 (c)(1),
(2) Date: Jun. 8, 2022

(87) PCT Pub. No.: WO2021/116599
PCT Pub. Date: Jun. 17, 2021

(65) Prior Publication Data
US 2023/0008213 A1 Jan. 12, 2023

(30) Foreign Application Priority Data
Dec. 11, 2019 (FR) ...................................... 1914137

(51) Int. Cl.
| | |
|---|---|
| *H01F 27/18* | (2006.01) |
| *B64D 47/00* | (2006.01) |
| *H01F 27/245* | (2006.01) |
| *H01F 27/30* | (2006.01) |

(52) U.S. Cl.
CPC ............. *H01F 27/18* (2013.01); *B64D 47/00* (2013.01); *H01F 27/245* (2013.01); *H01F 27/306* (2013.01)

(58) Field of Classification Search
CPC ...... H01F 27/18; H01F 27/245; H01F 27/306; B64D 47/00
See application file for complete search history.

(56) References Cited

U.S. PATENT DOCUMENTS

| | | | | | |
|---|---|---|---|---|---|
| 5,543,771 | A | * | 8/1996 | Levin ....................... | H01F 30/12 336/12 |
| 9,722,501 | B1 | * | 8/2017 | Gougerchian .......... | H02M 5/10 |
| 2004/0119571 | A1 | * | 6/2004 | Thibault ................. | H01F 30/12 336/5 |

FOREIGN PATENT DOCUMENTS

FR     3036875 A1 * 12/2016

OTHER PUBLICATIONS

Translation of FR3036875 (Year: 2025).*

* cited by examiner

*Primary Examiner* — Forrest M Phillips
(74) *Attorney, Agent, or Firm* — WOMBLE BOND DICKINSON (US) LLP

(57) ABSTRACT

The invention relates to an electromechanical device (10) for an aircraft, comprising: —a housing (12) having a radially internal surface (S12), —a magnetic circuit formed by a stack of laminated sheets and composed of an annular yoke (16), said yoke being arranged on the radially internal surface of said housing, said yoke having a radially internal surface (S16), —at least one low-frequency coil component (18), said coil component being integrated over at least part of the radially internal surface of said yoke.

10 Claims, 8 Drawing Sheets

Figure 8C
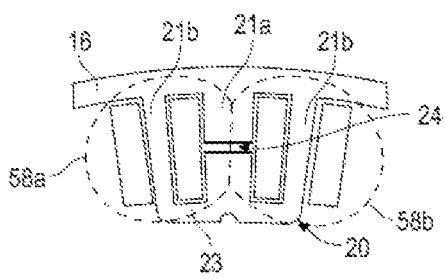
Figure 8D
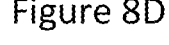
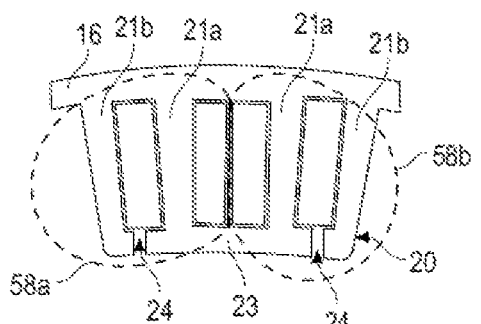
Figure 8E
Figure 9
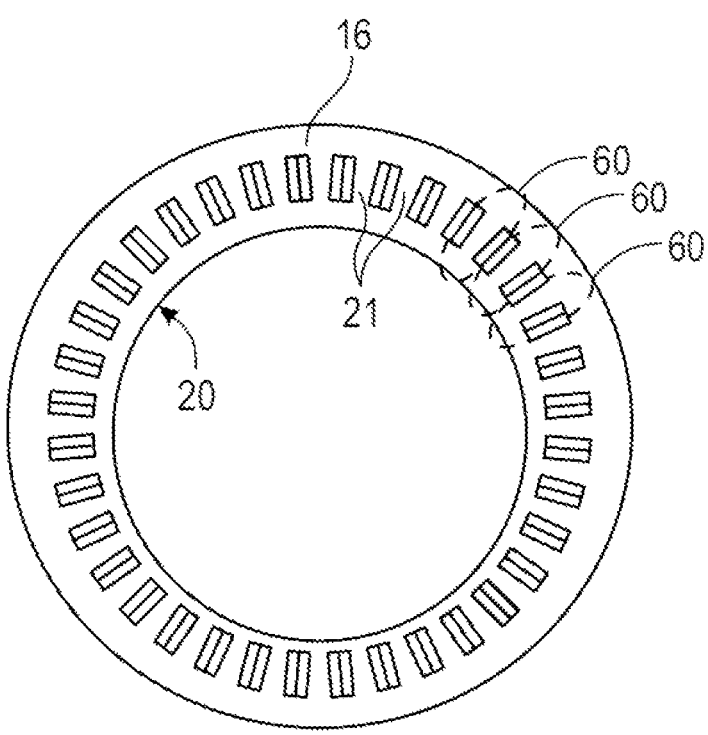

Figure 12

ELECTROTECHNICAL DEVICE FOR AN AIRCRAFT, COMPRISING LOW-FREQUENCY COIL COMPONENTS

TECHNICAL FIELD

The invention relates to an electrotechnical device for an aircraft comprising low-frequency coil components, such as inductors or power transformers.

PRIOR ART

The prior art comprises in particular the documents EP-A1-3 330 983, EP-A1-3 483 905 and US-A1-2017/345554.

It is well known that electrotechnical equipment is used in the field of aeronautics.

One of the current problems with this equipment is its integration and the optimization of its mass and its volume.

These electrotechnical equipment can comprise coil components, such as inductors or power transformers, which are integrated within a system such as power and/or control electronics, an actuator etc. It is then necessary to adapt the shape and minimize the volume of these coil components for their integration in the system. In addition, the integration of these coil components must be reliable and must allow to reach the desired performances, but also must respect the severe environmental constraints, such as thermal constraints, electromagnetic compatibility (EMC), or vibrations.

The conventional solutions for the realization of inductor type components are generally based on magnetic circuits made of ferrite or composite materials. These components are made in the form of bars assembled with one or more coil supports, or in the form of one or more cores which are then coiled directly on the magnetic circuit or circuits.

However, these components are not compact, and therefore have a large mass and volume, and as a result, their integration into a system is complex.

In addition, this type of material generally has a low mechanical strength and a low conductivity. It is therefore necessary to reduce the losses by Joule effect, or to set up a dedicated system to ensure the thermal dissipation and the maintenance of the coil components effective with regard to the constraints of vibrations encountered.

In addition, the manufacturing method for these components is usually complex. Thus, the tolerances of the magnetic properties of these components are generally variable, in the range of 20% to 30%, which directly affects the uncertainty of the parameters of the components obtained during production validation tests and the margins to be taken into consideration when designing the electrotechnical equipment.

The conventional solutions for the realization of power transformer components are generally based on magnetic circuits made either by sheet metal blocks formed of several portions which are assembled by gluing, or by alternate stacking of plates, or by winding thin sheet-metal tape.

However, there are usually residual air-gaps, intrinsic to the manufacturing mode (in particular during the gluing of several portions forming the sheet metal blocks), which are difficult to control during manufacturing, and which directly influence the characteristics of the component.

Generally speaking, these components are generally parallelepipedic in shape and do not fit easily into a circular housing or casing. Indeed, these components require specific parts, such as strapping of cut circuits, to ensure their maintenance and/or to make their attachment in their environment.

The purpose of the invention is to propose a solution allowing to remedy at least some of these disadvantages.

In particular, the invention proposes to reduce the mass and the volume, and thus the overall dimension, of these components, in order to facilitate their integration into a circular-shaped housing, but also to mutualize the coil components of a system.

SUMMARY OF THE INVENTION

To this end, the subject matter of the invention is an electrotechnical device for an aircraft comprising:
- an annular housing having a radially internal surface,
- a magnetic circuit formed by a stack of laminated sheets and composed of an annular yoke, said yoke being arranged on the radially internal surface of said housing, at least one portion of a radially external surface of said annular yoke being in contact with the radially internal surface of the housing and said yoke having a radially internal surface,
- at least one low-frequency coil component, said coil component being integrated on at least one portion of the radially internal surface of said yoke.

According to the invention, the terms "low-frequency" correspond to a frequency lower than or equal to 500 kHz depending on the materials used.

The device according to the invention allows a simple mechanical integration of the coil components, which allows to limit the attaching and maintaining parts of the components and of the device. In addition, the device according to the invention allows to mutualize a plurality of coil components on a same structure, here the yoke.

The modularity of the device according to the invention allows said device to adapt to the integration and environmental constraints (EMC, thermal or vibratory constraints).

Moreover, the manufacturing method of the magnetic circuit of the device according to the invention is simple, the steps of cutting (laser, water, wire, etc.) and assembling the laminated sheets being controlled. This allows to ensure that a variation of the electrical parameters of the components vary within a small range of about 5%.

The coil components are confined in the annular yoke, and thus in the annular housing, with its environment (for example a power and/or control electronic portion, an actuator, a generator, etc.) arranged in a compact manner, so as to minimize the volume of the device and the length of the electrical connections between the coil components connected in series or in parallel.

The yoke serves as a structure for the coil components, and allows them to be attached to the housing.

Advantageously, the yoke has a thermal dissipation function by conduction towards the outside, i.e. in a radially external direction. The contact between the yoke and the housing allows to facilitate the thermal dissipation of the iron and Joule effect losses of the device.

According to the invention, the magnetic circuit and the yoke are formed in one part. This allows to reduce the manufacturing costs, the mass of the device and ensures an optimum thermal dissipation of the losses outward.

In one embodiment, the yoke is glued to the housing.

In another embodiment, the yoke is hot sleeved onto the housing.

The magnetic circuit can be formed by a stack of laminated iron-silicon, iron-nickel, or iron-cobalt sheets.

The or each coil component can be a power transformer and/or an inductor. The device may comprise a plurality of coil components, the coil components being power transformers only, or inductors only, or both power transformers and inductors.

According to one embodiment, a coil component can be made of enamelled round wire of copper, aluminium or composite alloy, optionally twisted.

According to another embodiment, a coil component can be made of a copper or aluminium flat, or of an insulated copper or aluminium foil.

In order to guarantee a thermal homogenization, the magnetic circuit and/or the coiling of the coil component can be impregnated and/or encapsulated.

The yoke may comprise at least one protrusion extending radially from the radially internal surface of said yoke, said protrusion comprises at least one first tooth, at least one coil being integrated on said protrusion around said first tooth. According to the invention, a coil component is formed by one or a plurality of coils integrated with their magnetic circuit.

The protrusion may comprise a plurality of first teeth, with at least one coil integrated around each first tooth.

The protrusion may comprise two second teeth surrounding the first tooth, with at least one coil integrated on the protrusion between said second teeth.

The protrusion may comprise a plurality of second teeth, with two second teeth surrounding a first tooth, with at least one coil integrated between second teeth, around each first tooth.

The magnetic circuit can comprise at least one air-gap. An air-gap advantageously allows the magnetic flux in the coil components to be controlled. Indeed, an air-gap allows to avoid the dependence on the variations of the electrical properties of the material constituting the magnetic circuit. Moreover, depending on its positioning, the air-gap or the air-gaps can allow to simplify the coiling portion, for example, in the case of a reduction objective of the manufacturing costs.

The magnetic circuit may comprise at least one radial air-gap, i.e. extending in the radially internal direction.

Alternatively, the magnetic circuit may comprise at least one circumferential air-gap, i.e., extending circumferentially to the axis of the yoke.

The coil components can be single-phase components that allow to provide power electronic functions such as filtering, smoothing, parallelization or energy transfer.

According to one embodiment, the device comprises two low-frequency coil components, said coil components being coils connected in series, and each coil being wound around a first tooth.

The coils can have an identical direction of flux. Alternatively, the coils can be in opposite flux.

The protrusion can be provided with an air-gap, in order to minimize the volume to mass ratio of the magnetic circuit and reduce the sensitivity to the variations in the magnetic properties of the material of the magnetic circuit.

When the coil components comprise coils, these coils can be coupled or uncoupled, and/or interleaved. The coils can be connected in series or in parallel.

According to another embodiment, the device comprises a plurality of low-frequency coil components, said coil components being multi-phase coupled coils, each coil being wound around a first tooth, and said coils being integrated throughout the entire radially internal surface of the yoke.

According to another embodiment, the coil component is a multi-phase power transformer or autotransformer formed by a plurality of coils, each coil being wound around a first tooth. Depending on the manufacturing method adopted, a distributed type of coiling can also be implemented.

The protrusion can be provided with a radial air-gap, in order to increase the magnetic leaks and the self-inductances.

The protrusion can be provided with circumferential air-gaps, in order to limit the magnetic flux and to increase the magnetizing inductances or to manage leak inductance values if necessary.

The number of coils per phase depends on the integration constraints, and can be varied to reduce the thickness of the device and improve the cooling of the latter.

The or each coil component can be insulated from its magnetic circuit by an electrically insulating material, for example a Kapton® type material or epoxy resin.

The housing and/or the yoke can be equipped with cooling means.

The cooling means may comprise at least one of the following means:
fins extending radially or axially from a radially external surface of the housing and/or the yoke, and/or
fluid circulation channels, in which a pressurized fluid circulates, and/or
means for spraying a fluid, and/or
heat pipes (i.e. heat conducting elements).

The radial or axial fins allow to increase the exchange coefficients, in the case of forced air or fluid cooling, or in the case of natural convection and bubbling in a fluid such as oil. The fins can be treated by a specific treatment to increase the radiation, and thus the exchange coefficient (radiation).

The pressurized fluid circulating in the fluid circulation channels can be oil or glycol water.

The means for spraying a fluid can be configured to spray oil or water under pressure.

The cooling means may also comprise orifices in the yoke and ventilation means arranged so as to make circulate air through said orifices in the yoke.

Thus, the device can be cooled by natural convection (for low current density), or by forced convection with air circulating inside and/or outside the device, or by forced convection with a fluid circulating in the housing and/or in the yoke.

The yoke may comprise ribs for attaching said yoke to said housing, said ribs extend longitudinally along said yoke. This allows to facilitate the integration of the device, and optimizes the cooling of the device.

The invention also relates to an aircraft comprising at least one electrotechnical device according to the invention.

BRIEF DESCRIPTION OF FIGURES

The invention will be better understood and other details, characteristics and advantages of the present invention will become clearer from the following description made by way of non-limiting example and with reference to the attached drawings, in which:

FIG. 5 is a schematic view of a configuration comprising the device according to the invention, FIGS. 6A and 6B are cross-sectional views of coil components integrated into a yoke according to an embodiment of the invention, respectively without and with an external radial air-gap, FIGS. 8A to 8E are cross-sectional views of coil components integrated into a yoke according to an embodiment of the invention, respectively without air-gap, with a radial external air-gap, with a circumferential internal air-gap, with radial external air-gaps and with circumferential external air-gaps, FIG. 9 is a cross-sectional view of coil components integrated into a yoke according to one embodiment of the invention, FIG. 12 is a cross-sectional view of coil components integrated into a yoke according to an embodiment of the invention.

The elements having the same functions in the different embodiments have the same references in the figures.

DESCRIPTION OF THE EMBODIMENTS

FIGS. 1 to 4 show electrotechnical devices for aircraft according to the invention.

Figures 1, 2:
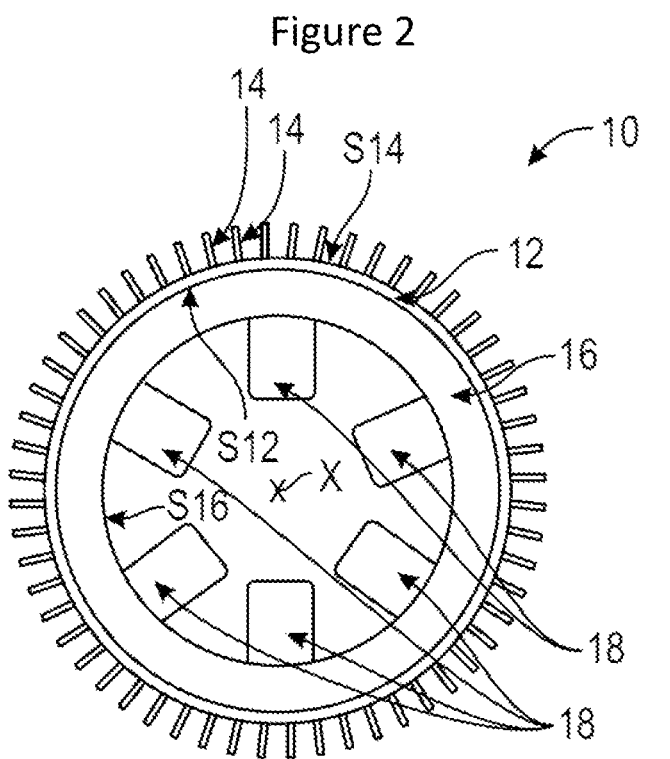
FIG. 1 is a very schematic view of the device according to the invention, comprising a coil component, for example of the power transformer type.
FIG. 2 is a very schematic view of the device according to the invention, comprising coil components, for example of the coil type.

A device 10 comprises an annular housing 12 extending about an axis noted X in FIGS. 1 to 4, comprising a radially internal surface S12 and comprising cooling means. The housing 12 can be a casing. In FIGS. 1 and 2, the cooling means are in the form of fins 14 that extend radially from a radially external surface S14 of the housing 12.

The device also comprises a magnetic circuit formed by a stack of laminated sheets. The laminated sheets forming the magnetic circuit can be insulated magnetic sheets, by a varnish or by a specific treatment according to the material used, so as to make the laminated magnetic circuit of only one part. The magnetic circuit is therefore cut out of laminated sheets in one portion. There is no assembly of several portions to form the magnetic circuit. This allows to avoid assembly problems and guarantee the electrical parameters of the component. The magnetic circuit can be formed by a stack of laminated iron-silicon, iron-nickel, or iron-cobalt sheets. The thickness of the laminated sheets is chosen according to the envisaged eddy current losses contributing to the efficiency of the component. Note that the modification of the thickness of the magnetic circuit is a factor that allows to adapt the characteristics of the component (inductances, voltages, etc.) without changing its definition (sheets, conductor section, etc.).

The magnetic circuit consists of an annular yoke 16 extending around the axis X and having a radially internal surface S16. The magnetic circuit and the yoke are therefore formed in one part. The yoke 16 is arranged on the surface S12 of the housing 12.

The yoke 16 can be glued, by means of a thermal paste or an adhesive, to the housing 12, and more precisely to the surface S12 of the housing 12. Alternatively, and preferably, the yoke 16 is attached by thermal expansion, i.e., hot sleeved onto the housing 12. The housing 12 is heated, while the yoke 16 is cooled. Then, the yoke 16 is inserted into the housing 12 and clamps against the surface S12 of the housing 12 by thermal expansion. This advantageously allows a good thermal contact between the yoke and the housing, and thus a good thermal exchange between the yoke and the housing, and thus a better cooling of the device. This also allows to eliminate the need for additional parts to attach the yoke to the housing.

The yoke 16 has a thermal dissipation function by conduction towards the housing 12. The contact between the yoke 16 and the housing 12 allows to facilitate the thermal dissipation of the losses from the device 10.

Although not shown, the cooling means may comprise orifices in the yoke 16 and venting means arranged so as to make circulate a flux of air or a fluid through these orifices.

Thus, the device can be cooled by natural convection, or by forced convection with air circulating inside and/or outside the device 10, or by forced convection with a fluid circulating in the housing 12 or in the yoke 16.

Figure 3:
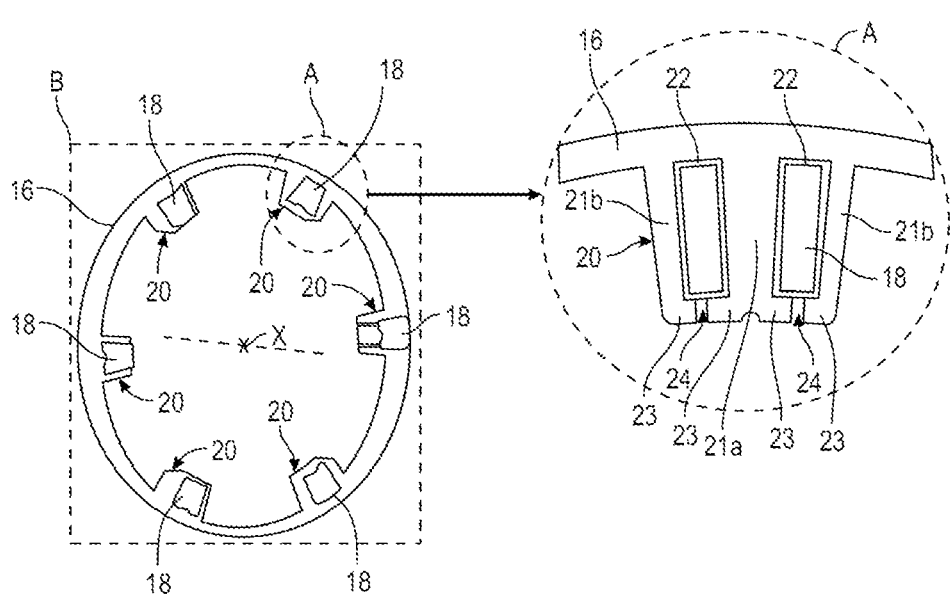
FIG. 3 is a schematic perspective view of the yoke and the coil-type coil components of the device according to one embodiment of the invention, and in the box A, an enlarged cross-sectional view of a portion of said device.
Figure 4:
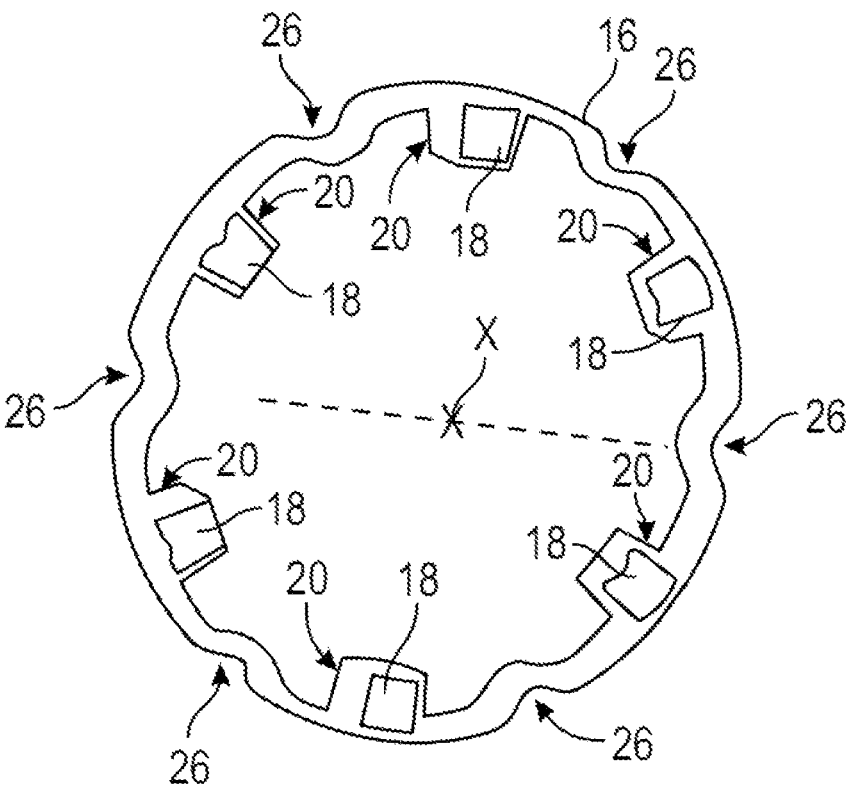
FIG. 4 is a schematic perspective view of the yoke and the coil-type coil components of the device according to another embodiment of the invention.

The device 10 also comprises one or more low-frequency coil components 18. The coil components 18 may be of the power transformer type, as shown in FIG. 1, and/or the inductor type, as shown in FIGS. 2 to 4. The device 10 may comprise only power transformers, or only inductors, or both power transformers and inductors. In FIG. 1, the coil component 18 is integrated over the entire surface S16 of the yoke 16, while in FIG. 2, the six coil components 18 are integrated over only a portion of the surface S16 of the yoke 16. Of course, the device 10 may comprise a different number of coil components 18, which may be arranged differently on the surface S16 of the yoke 16.

In particular, the yoke 16 serves as a structure for the coil components, and allows their attachment to the housing 12. The coil components 18 are thus confined into the radially internal portion of the yoke 16, and thus into the housing 12. The yoke advantageously allows the number of coil components to be adapted according to the needs of the device and the integration of the device with its environment.

The coiling of a coil component 18 may be made of enamelled round wire of copper, aluminium or composite alloy, possibly twisted, or of a flat of copper or aluminium, or of an insulated copper or aluminium foil. This coiling, as well as the magnetic circuit, can be impregnated and/or encapsulated.

The magnetic circuit allows to channel the magnetic flux of the coil components 18.

The yoke 16 may comprise protrusions 20 extending radially from the surface S16. A protrusion 20 may comprise at least one central tooth 21a surrounded by two outer teeth 21b. Alternatively, a protrusion 20 may comprise only one or a plurality of central teeth 21a, or only two outer teeth 21b. As shown in the box A in FIG. 3, a coil 18 is integrated on a protrusion 20. One or more coils integrated in its magnetic circuit form a coil component. This coil is wound around the central tooth 21a, and is surrounded by the two outer teeth 21b. The central tooth 21a may be circumferentially connected at its radial end to the outer teeth 21b by a connecting segment 23.

As shown in the box A of FIG. 3, a coil 18 may be insulated from the yoke 16, and thus from its magnetic circuit, by an electrically insulating material 22, such as a Kapton® type material or epoxy resin.

As shown in the box A of FIG. 3, the protrusion 20 may be provided with radial air-gaps 24. These air-gaps 24 extend in the radially internal direction, i.e., from the protrusion 20 and in the direction of the axis X. These radial air-gaps 24 are arranged on the connecting segment 23 connecting the central tooth 21a and the outer teeth 21b.

The yoke 16 may comprise ribs 26 for attachment to the housing 12, as shown in FIG. 4. These ribs 26, or radial recesses, of the yoke 16 extend longitudinally, i.e., along the axis X, along the yoke 16. These ribs 26 allow to facilitate the integration and improve the cooling of the device 10. Indeed, thanks to this positioning of the ribs 26, the attachment of the yoke 16 to the housing 12 does not disturb the cooling air flux.

Figures 5, 6A:
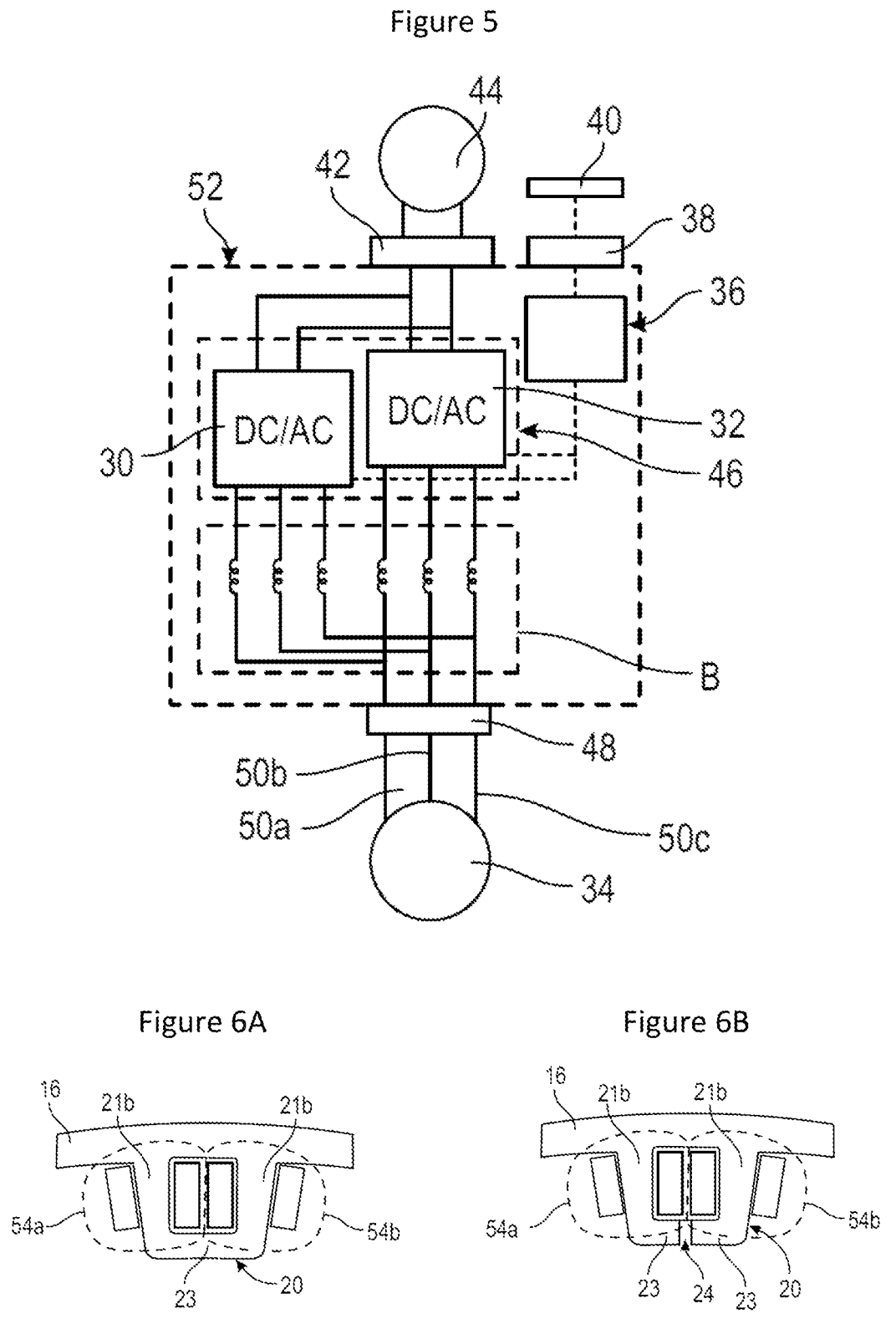

FIG. 5 shows an example of configuration that comprises a device according to the invention. The device comprises six uncoupled coils Lc11, Lc12, Lc13, Lc21, Lc22, and Lc23 that are configured to parallel two inverters 30, 32 to control an electric actuator 34. The coils Lc11-Lc23 are connected to the actuator 34 via a connector 48 and power cables 50a, 50b, 50c. The coils Lc11-Lc23 are interphase coils. These coils are configured to limit the fault current between each same phase of the inverters 30, 32 and to limit over-voltages to the terminals of the electric actuator 34. The coils Lc11-Lc23 in the box B of FIG. 5 correspond to the coils 18 in FIG. 3. The inverters 30, 32 can be DC-AC power converters (DC-AC for Direct Current-Alternative Current). The inverters 30, 32 form a power electronics portion 46, which is connected to a control electronic board 36, which forms a control electronic portion. The control electronic board 36 is connected, via a connector 38, to a communication bus 40. The inverters 30, 32 are connected, via a connector 42, to a direct current bus 44. The set of the coils Lc11-Lc23, the power electronics 46 and the control electronics 36 form the equipment 52 which is arranged in the yoke 16, and thus in the housing 12.

As shown in FIGS. 6A and 6B, the device may comprise two coils 54a, 54b connected in series and having an identical direction of flux. These coils are single-phase components which allow to ensure filtering, smoothing or parallelization functions. The coils 54a, 54b are integrated on a protrusion 20 of the yoke 16. In these figures, the protrusion 20 comprises only two outer teeth 21b, which are connected to each other by a connecting segment 23 at their radial end. Each coil 54a, 54b is wound around an outer tooth 21b. These coils 54a, 54b are not completely surrounded by the protrusion 20. These coils can be made on one or more protrusions 20 of the yoke 16 in order to minimize their height.

Figure 7A:
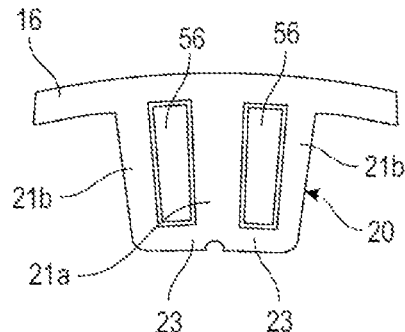
FIGS. 7A to 7D are cross-sectional views of coil components integrated into a yoke according to an embodiment of the invention, respectively without air-gaps, with an internal circumferential air-gap, with external circumferential air-gaps and with external radial air-gaps.
Figure 7B:
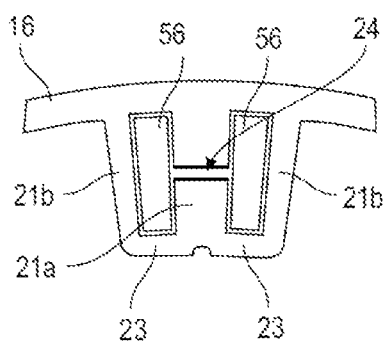

In order to minimize the volume-to-mass ratio of the magnetic circuit and to reduce the dependence on variations in the magnetic properties of the material used to make the magnetic circuit, a radial air-gap 24 can be added, as shown in FIG. 7B. Thus, the protrusion 20 is provided with an air-gap 24 that extends in a radially internal direction. The radial air-gap 24 is arranged on the connecting segment 23 of the outer teeth 21b of the protrusion 20.

As shown in FIGS. 7A to 7D, the device may comprise an uncoupled coil 56. This coil 56 is integrated into a protrusion 20 of the yoke, and more precisely wound around the central tooth 21a of the protrusion 20. This coil 56 is surrounded by the two outer teeth 21b of the protrusion 20. These outer teeth form return branches on the coil 56. This allows to reduce the EMC problems, and in particular the radiated emissions induced by the leak fluxes of the coils, which can disturb the electronic boards, sensors and other coil components located in the vicinity. These outer teeth allow to channel a portion of this magnetic flux.

Figure 7C:
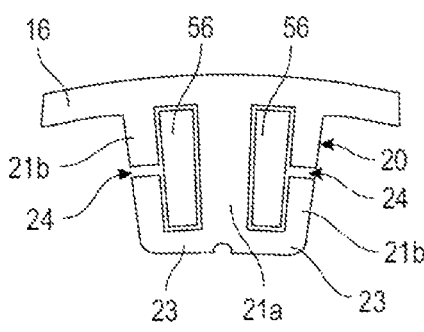
Figure 7D:
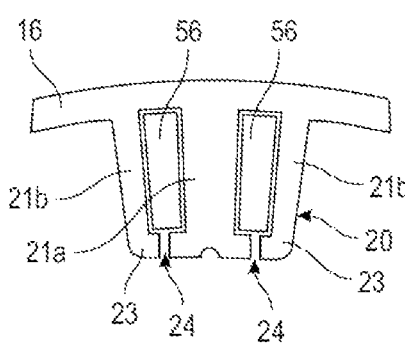

The magnetic circuit in FIG. 7A comprise no air-gap, while the magnetic circuits in FIGS. 7B to 7D comprise an air-gap or air-gaps 24.

As shown in FIG. 7B, the circumferential air-gap 24 may be positioned on the central tooth 21a. This allows to reduce the disturbances between the coil components.

As shown in FIG. 7C, the circumferential air-gaps 24 may be positioned on the outer teeth 21b. As shown in FIG. 7D, the radial air-gaps 24 may be positioned on the outer teeth 21b, and more specifically on the connecting segment 23 between the outer teeth 21b. The position of the air-gaps on the outer teeth advantageously allows to facilitate the coiling operation.

As shown in FIGS. 8A to 8E, the device may comprise two coils 58a, 58b coiled so as to be in opposite flux. The coils 58a, 58b are interleaved or coupled. In particular, the components are coupled or common mode interphase inductors. The coils 58a, 58b are integrated in a protrusion 20 of the yoke 16.

Figure 8A:
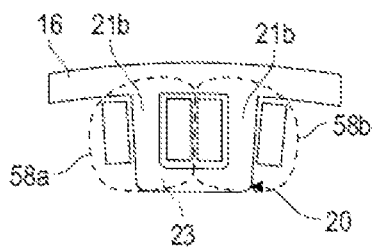
Figure 8B:
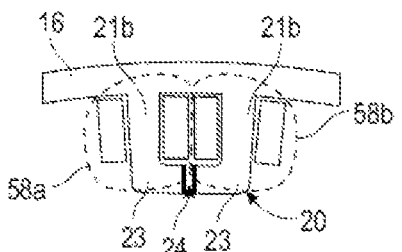

In FIGS. 8A and 8B, the protrusion 20 comprises only two outer teeth 21b, which are connected to each other by a connecting segment 23 at their radial ends. Each coil 58a, 58b is wound around an outer tooth 21b. These coils 58a, 58b are not completely surrounded by the protrusion 20. As shown in FIG. 8B, a radial air-gap 24 may be positioned on the connecting segment 23 between the outer teeth 21b.

However, with this topology arrangement, the resulting magnetic flux closes in the air, which can cause induced currents in the surrounding metal elements and disturb electronic boards or coil components nearby.

In FIG. 8C, the protrusion 20 comprises two outer teeth 21b, which are connected to each other by a connecting segment 23 at their radial ends. As before, each coil 58a, 58b is wound around an outer tooth 21b. These coils 58a, 58b are therefore not completely surrounded by the protrusion 20. An additional tooth, here a central tooth 21a, is added compared to FIGS. 8A and 8B in order to channel this resulting flux and control the leak inductance of the component. The coils 58a, 58b are separated by the central tooth 21a.

In FIGS. 8D and 8E, the protrusion 20 comprises two central teeth 21a, which are connected to each other by a connecting segment 23 at their radial ends. Each coil 58a, 58b is wound around a central tooth 21a. Additional teeth, in this case two outer teeth 21b, are added with respect to FIGS. 8A and 8B in order to channel this resulting flux and control the leak inductance of the component. Each coil 58a, 58b is surrounded by an outer tooth 21b and the other coil 58b, 58a. Thus, these coils 58a, 58b are completely surrounded.

As shown in FIG. 8C, a circumferential air-gap 24 may be positioned on the central tooth 21a. This allows the magnetic flux to be channeled into the central tooth 21a, which has a high equivalent reluctance compared to the main reluctance, so that the mutual inductance is as high as possible (differential mode management).

As shown in FIG. 8D, the radial air-gaps 24 may be positioned on the outer teeth 21*b*, and more specifically on the connecting segment 23 between the outer teeth 21*b*. As shown in FIG. 8E, the circumferential air-gaps 24 may be positioned on the outer teeth 21*b*. This advantageously allows to have an armoured version, by channeling the resulting magnetic flux in the outer teeth 21*b*.

In order to achieve a common and differential mode filtering in a multi-phase system, the coil components can be coupled multi-phase coils. FIG. 9 shows an example embodiment of a device comprising three-phase coupled coils made by concentric coiling. In this Figure, a set of coils 60 is integrated on the entire surface S16 of the yoke 16. These coils 60 can be connected in parallel or in series. The coils 60 are arranged around teeth 21 of the protrusion 20 of the yoke 16.

Figure 10A:
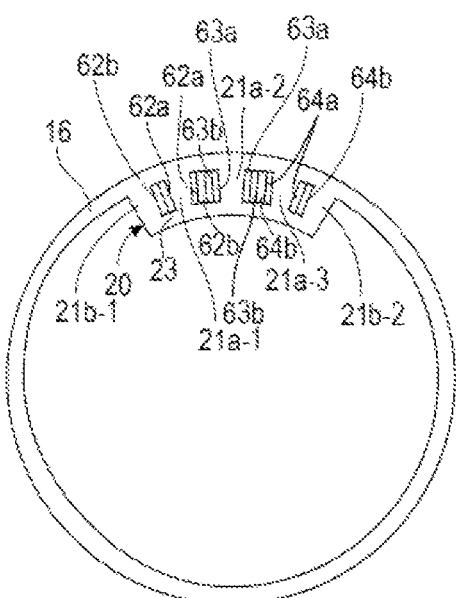
FIGS. 10A to 10C are cross-sectional views of coil components integrated into a yoke according to an embodiment of the invention, respectively without air-gaps, with radial external air-gaps, and with circumferential external air-gaps.
Figure 10B:
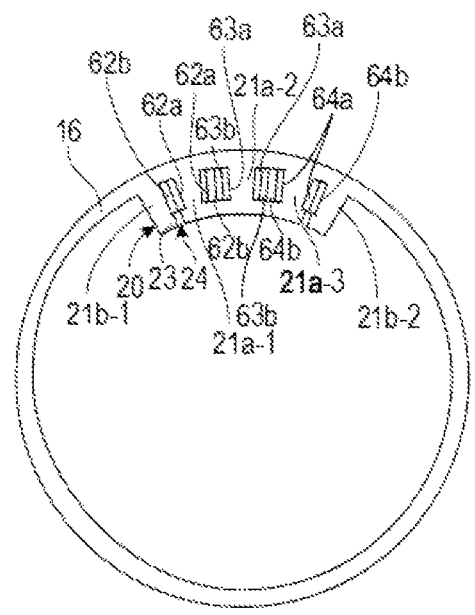
Figure 10C:
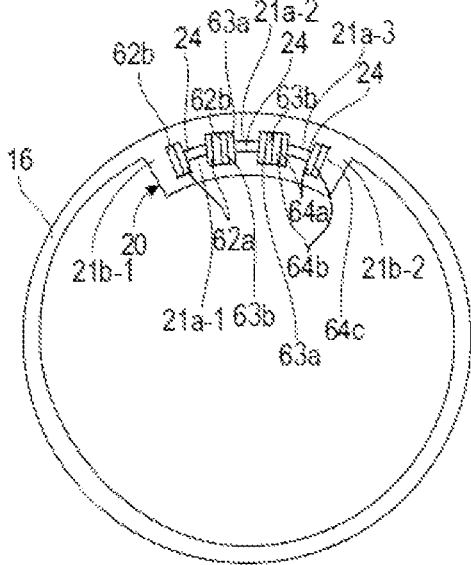

A multi-phase free-flux power transformer, or autotransformer, can be formed by a plurality of coils. The coils can be connected in series or in parallel depending on the functionality of the component (star, delta, zigzag connection. etc.). The number of coils depends on the desired function. FIGS. 10A to 10C show an example of an embodiment of a device comprising a multi-phase power transformer formed by three-phase coils 62*a*, 62*b*, 63*a*, 63*b*, 64*a*, 64*b* of the armoured type, the coils being locally integrated on only a portion of the surface S16 of the yoke 16. The coils 62*a*, 63*a*, 64*a* are primary coils and the coils 62*b*, 63*b*, 64*b* are secondary coils. The coils 62*a*-64*b* may have a galvanic insulation (i.e. there is no connection between the coils of each phase).

In FIGS. 10A to 10B, the protrusion 20 comprises three central teeth 21*a*-1, 21*a*-2, 21*a*-3 and two outer teeth 21*b*, which are connected to each other by a connecting segment 23 at their radial ends. The coils 62*a*-62*b* are wound around a first tooth 21*a*-1, while the coils 63*a*-63*b* are wound around a second tooth 21*a*-2 and the coils 64*a*-64*b* around a third tooth 21*a*-3. Specifically, the coils 62*a*-62*b* are concentric, the coil 62*b* being wound around the coil 62*a*. Similarly, the coils 63*a*-63*b* are concentric, the coil 63*b* being wound around the coil 63*a*. Similarly, the coils 64*a*-64*b* are concentric, the coil 64*b* being wound around the coil 64*a*. The coil 62*b* is surrounded by an outer tooth 21*b*-1 and the second central tooth 21*a*-2. The coil 64*b* is surrounded by an outer tooth 21*b*-2 and the second central tooth 21*a*-2. Thus, the coils 62*a*-64*b* are completely surrounded. In these figures, there are thus two coils integrated around each tooth 21*a*-1, 21*a*-2 and 21*a*-3, one for the primary portion, and one for the secondary portion.

The magnetic circuit in FIG. 10A comprises no air-gap, while the magnetic circuits in FIGS. 10B and 10C comprise air-gaps 24.

As shown in FIG. 10B, the radial air-gaps 24 may be positioned on the outer teeth 21*b*, and more specifically on the connecting segment 23 between the outer teeth 21*b*. This advantageously allows to increase the magnetic leaks and the self-inductance.

As shown in FIG. 10C, the circumferential air-gaps 24 may be positioned on the central teeth 21*a*-1, 21*a*-2, 21*a*-3. This advantageously allows to limit the magnetic flux. When the air-gaps are positioned on the outer teeth, this allows to increase the magnetizing inductances.

The air-gaps allow to adjust the parameters of the power transformer and to reduce the impact of the material composing the magnetic circuit.

Depending on the integration constraints, the number of teeth or coils per phase can be increased. Also, the pattern developed on the entirety of the yoke can be modified, connecting each coil of the same phase in series or in parallel to reduce the thickness of the device and improve the cooling.

Figure 11A:
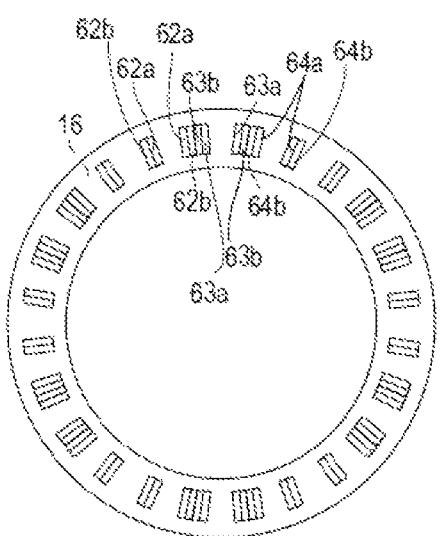
FIGS. 11A to 11C are cross-sectional views of coil components integrated into a yoke according to an embodiment of the invention, respectively without air-gaps, with external radial air-gaps and with external circumferential air-gaps.
Figure 11B:
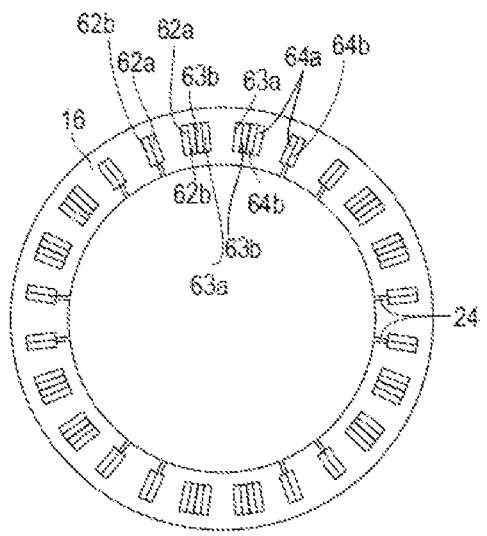
Figure 11C:
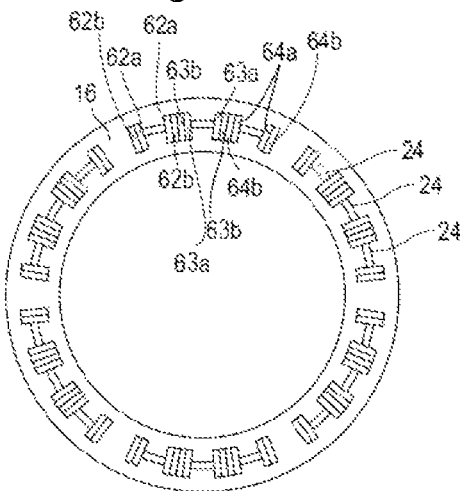

For example, FIGS. 11A to 11C represent FIGS. 10A to 10C, respectively, with a repetition of the transformer over the entire surface S16 of the yoke 16. The primary coils 62*a*, 63*a*, 64*a* and the secondary coils 62*b*, 63*b*, 64*b* are integrated over the entire circumference of the surface S16 of the yoke 16. This configuration advantageously allows to maximize the central space of the yoke 16.

Figure 12:
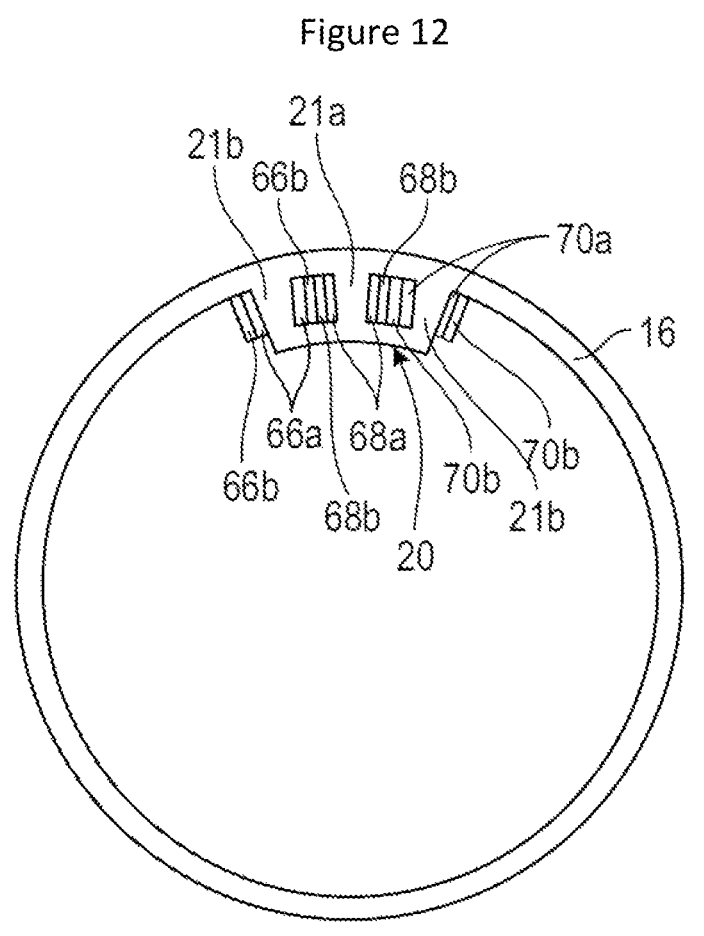

A transformer, or a forced-flux multi-phase autotransformer, can be implemented locally on only a portion of the surface S16 of the yoke 16, as shown in FIG. 12. The transformer comprises six coil components 66*a*, 66*b*, 68*a*, 68*b*, 70*a* and 70*b*.

In FIG. 12, the protrusion 20 comprises a central tooth 21*a* and two outer teeth 21*b*. The coils 66*a*-66*b* are wound around a first outer tooth 21*b*, while the coils 68*a*-68*b* are wound around the central tooth 21*a*, and the coils 70*a*-70*b* are wound around a second outer tooth 21*b*. Specifically, the coils 66*a*-66*b* are concentric, the coil 66*b* being wound around the coil 66*a*. Similarly, the coils 68*a*-68*b* are concentric, the coil 68*b* being wound around the coil 68*a*; and the coils 70*a*-70*b* are concentric, the coil 70*b* being wound around the coil 70*a*. The coils 66*b* and 70*b* are not completely surrounded.

The magnetic circuit in FIG. 12 comprises no air-gap. Of course, this magnetic circuit may comprise an air-gap on the protrusion 20, as previously described for FIGS. 10B, 10C, 11B and 11C.

As before, for integration constraints, the number of teeth or coils per phase can be increased or the pattern developed on the entirety of the yoke can be modified by connecting each coil of the same phase in series or in parallel in order to reduce the thickness of the device.

The invention claimed is:

1. An electrotechnical device for an aircraft comprising:
   an annular housing having a radially internal surface,
   a magnetic circuit formed by a stack of laminated sheets and composed of an annular yoke, said yoke being arranged on the radially internal surface of said housing, at least one portion of a radially external surface of said annular yoke being in contact with the radially internal surface of the housing and said yoke having a radially internal surface,
   at least one low-frequency coil component, said coil component being integrated on at least one portion of the radially internal surface of said yoke,
   wherein the yoke comprises at least one protrusion extending radially from the radially internal surface of said yoke, said protrusion comprises at least one first tooth, said at least one first tooth being a part of the protrusion situated inside said protrusion, at least one coil being integrated on said protrusion around said first tooth, and another part of the protrusion surrounding partially or totally said at least one coil.

2. The electrotechnical device according to claim 1, wherein said protrusion comprises two second teeth surrounding said first tooth, the at least one coil being integrated on the protrusion between said second teeth.

3. The electrotechnical device according to claim 1, comprising at least two low-frequency coil components, said protrusion comprising two first teeth, said coil components being coils connected in series, each coil being wound around a first tooth.

4. The electrotechnical device according to claim 1, comprising a plurality of low-frequency coil components, said protrusion comprising a plurality of first teeth, said coil components being multi-phase coupled coils, each coil being wound around a first tooth, and said coils being integrated throughout the radially internal surface of the yoke.

5. The electrotechnical device according to claim 1, wherein the coil component is a multi-phase power transformer or autotransformer formed by a plurality of coils, said protrusion comprising a plurality of first teeth, each coil being wound around a first tooth.

6. The electrotechnical device according to claim 1, wherein the magnetic circuit comprises at least one air-gap.

7. The electrotechnical device according to claim 1, wherein the or each coil component is insulated from its magnetic circuit by an electrically insulating material.

8. The electrotechnical device according to claim 1, wherein the housing and/or the yoke (16) is equipped with cooling means.

9. The electrotechnical device according to claim 8, wherein the cooling means comprise at least one of the following means:

fins extending radially or axially from a radially external surface of the housing and/or of the yoke, and/or fluid circulation channels, in which a pressurized fluid circulates, and/or means for spraying a fluid, and/or heat pipes.

10. An aircraft comprising at least one electrotechnical device according to claim 1.

* * * * *